E. CRAIG.
MACHINE FOR MAKING RECEPTACLES.
APPLICATION FILED MAR. 29, 1915.
1,205,330.
Patented Nov. 21, 1916.
5 SHEETS—SHEET 3.
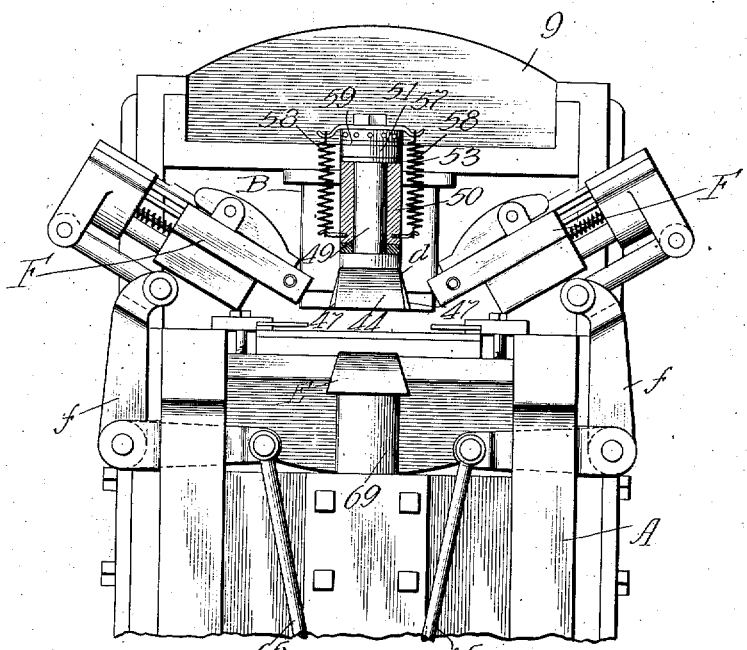
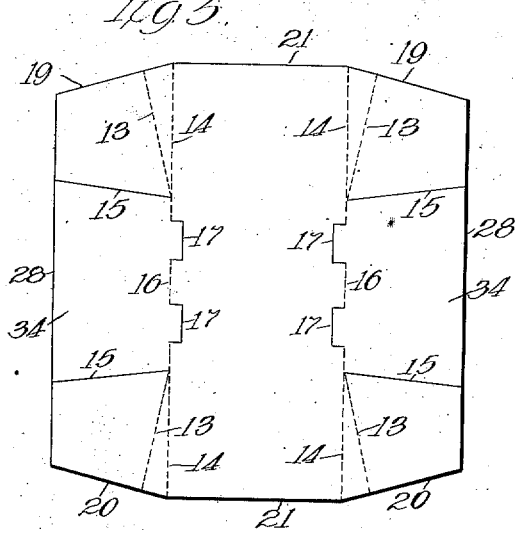
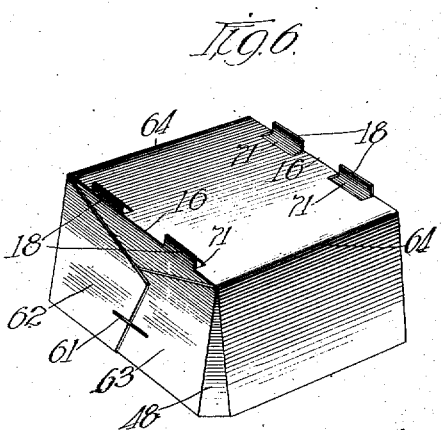
Witnesses:
Inventor:
Edward Craig
By Arthur F. Durand
Atty E. CRAIG.
MACHINE FOR MAKING RECEPTACLES.
APPLICATION FILED MAR. 29, 1915.
1,205,330.
Patented Nov. 21, 1916.
5 SHEETS—SHEET 4.
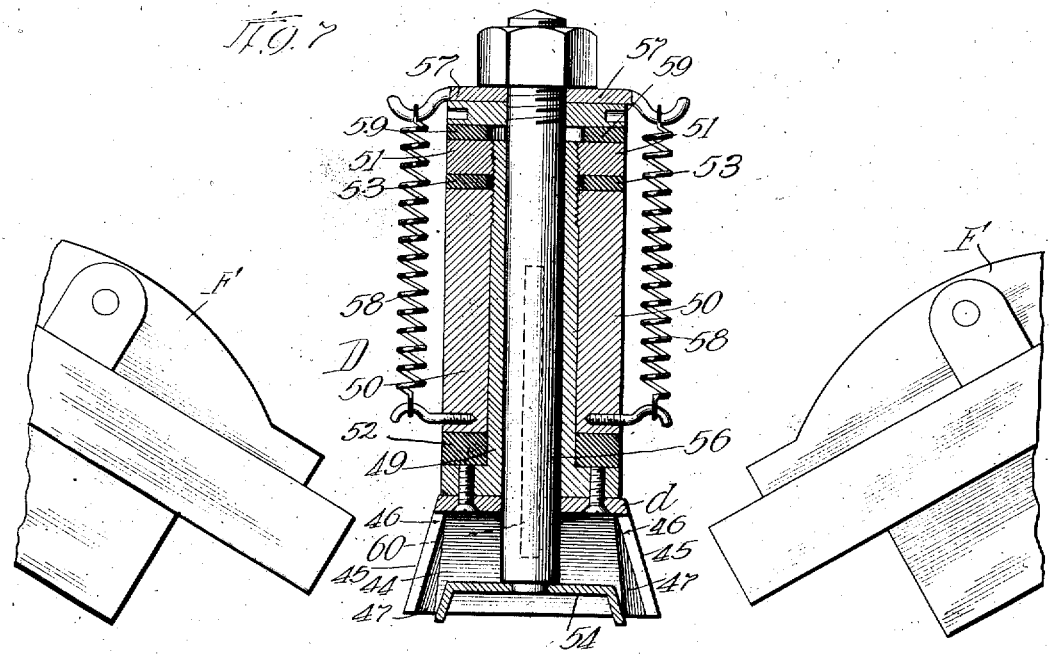
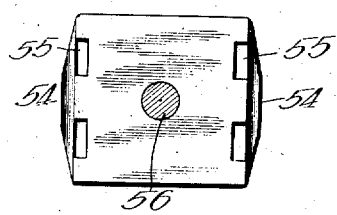
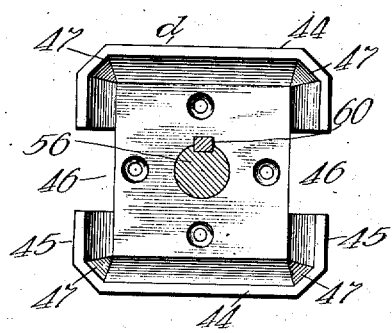
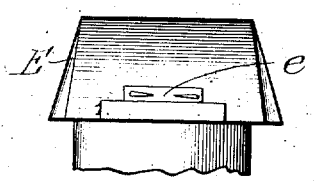
Witnesses
Arthur W. Carlson
Robert H. Weir
Inventor
Edward Craig
By Arthur F. Arnaud
Atty E. CRAIG.
MACHINE FOR MAKING RECEPTACLES.
APPLICATION FILED MAR. 29, 1915.
1,205,330.
Patented Nov. 21, 1916.
5 SHEETS—SHEET 5.
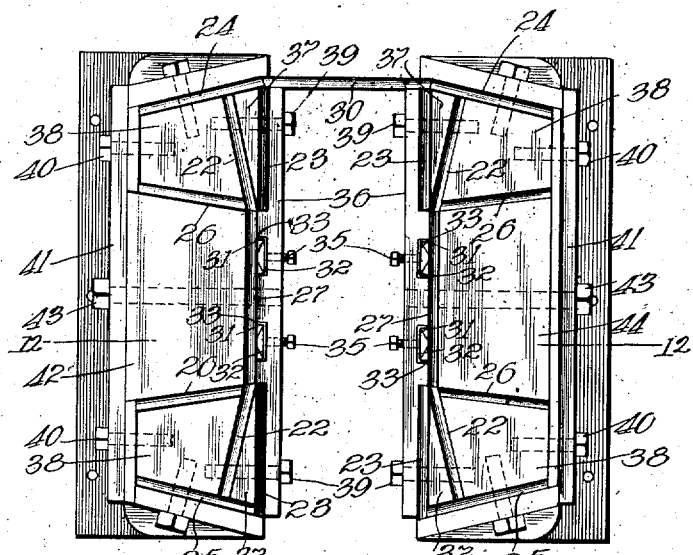
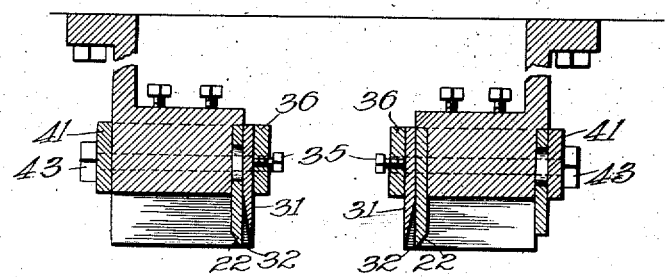
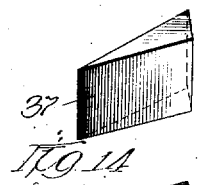
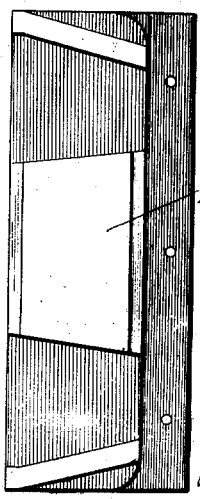
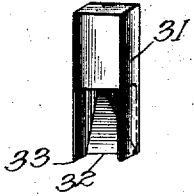
Witnesses:
Inventor:
Edward Craig
By Arthur F. Durand
Atty

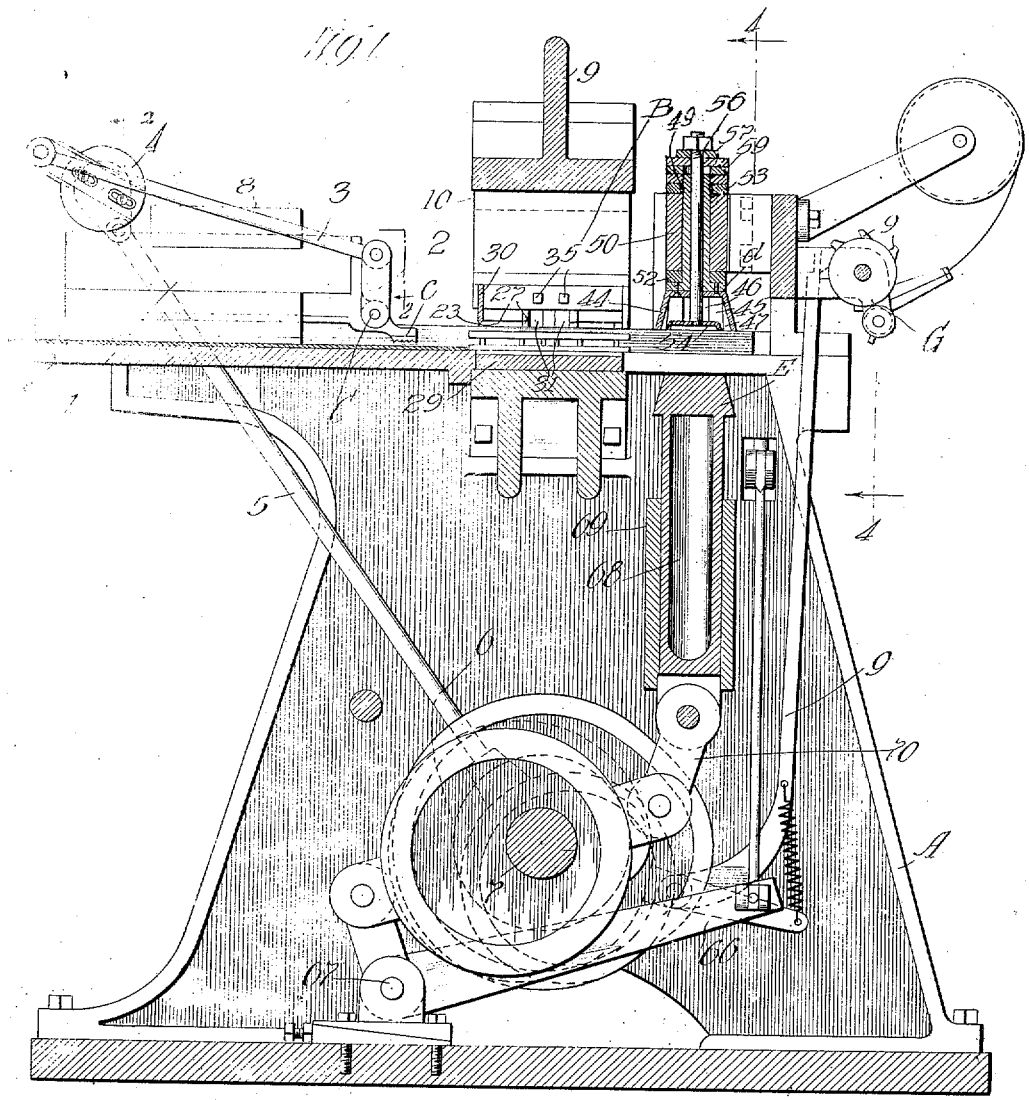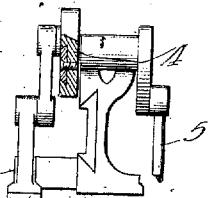

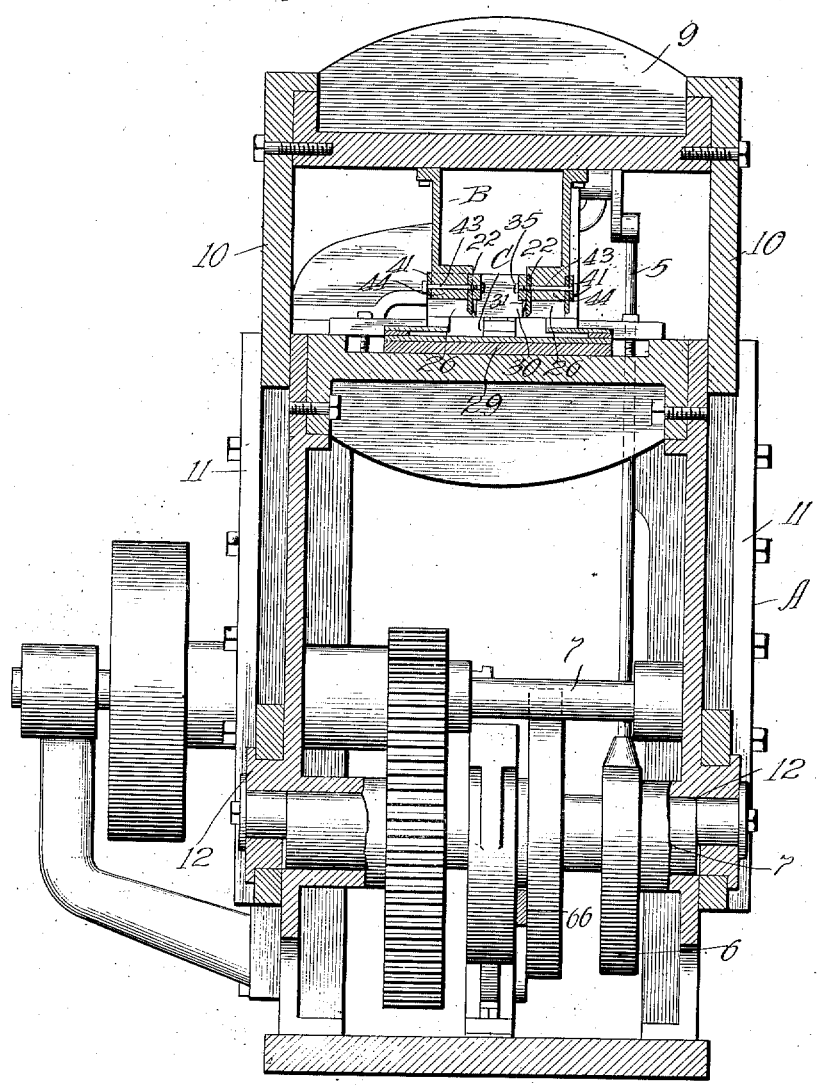

UNITED STATES PATENT OFFICE.

EDWARD CRAIG, OF ST. JOSEPH, MICHIGAN, ASSIGNOR TO SARANAC MACHINE COMPANY, OF BENTON HARBOR, MICHIGAN, A CORPORATION OF MICHIGAN.

MACHINE FOR MAKING RECEPTACLES.

1,205,330.   Specification of Letters Patent.   Patented Nov. 21, 1916.

Application filed March 29, 1915. Serial No. 17,609.

*To all whom it may concern:*

Be it known that I, EDWARD CRAIG, a citizen of the United States of America, and resident of Niles avenue, St. Joseph, Berrien county, Michigan, have invented a certain new and useful Improvement in Machines for Making Receptacles, of which the following is a specification.

My invention relates to stapling machines for making berry boxes or baskets of the kind in which openings are made in the bottom of the receptacle for the ventilation of the berries or other fruit, and in which portions which are cut away to form these openings serve as feet for the box, the sides of the receptacle being inclined outwardly to provide a slightly flared box having flat corners formed by relatively narrow and downwardly tapered sections of the sheet material.

The object of my invention is to provide a box forming and stapling machine which will automatically form the said feet and openings for the bottom of the box, which will properly staple the latter without breaking or bending the said feet, and having means for properly forming the flattened corners of the box or basket-like receptacle.

It is also an object to provide certain details and features of construction and combinations tending to increase the general efficiency and desirability of a box or basket forming and stapling machine of this particular character.

To the foregoing and other useful ends my invention consists in matters hereinafter set forth and claimed.

In the accompanying drawings Figure 1 is a central longitudinal section of a basket-forming and stapling machine embodying the principles of my invention. Fig. 2 is an enlarged detail section on line 2—2 in Fig. 1. Fig. 3 is a transverse section of the machine shown in Fig. 1, showing certain of the elements in side elevation. Fig. 4 is a detail section on line 4—4 in Fig. 1. Fig. 5 is a plan view of the blank which is formed by the said machine and from which the desired berry box or basket is made. Fig. 6 is a perspective of the said berry box or basket, or other receptacle, showing the same upside down in order to bring into view the ventilating openings in the bottom of the box, and for the purpose of showing the four feet or short supports which are formed by the punching out of certain small rectangular sections of the thin material to form said openings. Fig. 7 is an enlarged detail section of the mechanism for supporting the mold or hollow form into which the sheet material is thrust by the upward movement of the solid form or plunger, showing said mold in vertical section, and showing also the folding device which coöperates with the mold and plunger to properly fold the blank. Fig. 8 is a bottom view of the folding device shown below the mold, and practically inside thereof, in Fig. 7. Fig. 9 is a similar view of the hollow mold or form. Fig. 10 is an enlarged side elevation of the tapered plunger which moves upwardly to coöperate with the mold in forming the box, and upon which the box is then stapled at the opposite sides thereof. Fig. 11 is a bottom view of the upper die of the blanking press by which the blanks are made. Fig. 12 is a section on line 12—12 in Fig. 11. Figs. 13 and 14 are perspectives of the spacing block for the scoring knives. Fig. 15 is a bottom view of one of the head sections to which the scoring knives are secured. Fig. 16 is a perspective of one of the knives which punch the ventilating openings in the bottom of the box, and which thereby form the feet for the box.

As thus illustrated, my invention comprises a frame or body A provided at its top or upper end with a flat table $a$ to support the sheet material from which the boxes are made. The said material is fed to the blanking press B by the feed device C, which latter comprises a foot or engaging portion $c$ pivoted to the slide 1 and provided with an arm 2 connected by the rod or pitman 3 with the crank-plate 4 which is suitably mounted for rotation at one end of the machine. This crank-plate is operated by a rod or pitman 5 connected with the eccentric 6 on the drive-shaft 7 which is mounted in bearings on the frame of the machine. With this arrangement the reciprocation of the rod 5 will oscillate the crank-plate 4, and this in turn will reciprocate the rod 3, thereby causing the foot $c$ to outwardly engage and disengage the upper surface of the feet material to feed the latter to the said blanking press. When the rod 3 moves forward, it not only pushes the feet $c$ downward and into engagement with the said material, but also causes the slide 1 to move forward in its guide 8, the latter being suitably supported above the sheet material. The said blanking press comprises a cross-head 9 rigidly secured to the vertically reciprocating members 10 which slide in guide-ways 11 on the sides of the machine. The lower ends of these members 10 are suitably connected with the eccentric devices 12 on the outer ends of the shaft 7 previously described. The said cross-head 9 is equipped with the cutting and scoring devices shown in Figs. 11 to 16 inclusive, and which are as follows: As shown in Fig. 5, the blank has the score lines 13 and 14, the straight cuts 15, the score lines 16, and the short cuts 17 which form the rectangular feet or supports 18 of the box. The said blank must also be formed with the oblique edges 19 and 20, and with the straight edges 21 at each end thereof. For this purpose the device is shown in Fig. 11 comprising scoring knives 22 suitably positioned for making the angular score lines 13, and similar knives 23 for making the score lines 14, it being observed that these are duplicated at each end of the cutting and scoring die. The edges 19 are formed by the cutting knives 24, and similar knives 25 form the edges 20 at the other end of the blank. Cutting knives 26 are suitably positioned for making the straight cuts 15, and parallel scoring knives 27 are provided for making the score lines 16, the outer edges 28 being those of the strip of sheet material which is fed to the machine. A blank is formed each time the cross-head 9 moves downward, it being understood that a lower die or table 29 is employed for supporting the sheet material below the cross-head. Each blank is cut off by the knife 30 disposed at one end of the upper die, and in this way the straight edges 21 of the blank are formed by the blanking press. The feet 18 of the box, formed by the cuts 17, are produced by the knives 31, see Fig. 16, and each said knife is provided with a straight edge 32 having short right angle edges 33 at the opposite ends thereof, whereby short rectangular sections are punched out to form the feet. The knives 27, however, are of such character that the score lines 16 do not cross the said feet, whereby the latter are rigid with the end walls 34 of the box and extend downward in continuation thereof when the box is finished and right side up. The knives 31 are held in place by set screws 35 suitably inserted through the retaining strips 36 of the upper die. Spacing blocks 37 are interposed between the knives 22 and 23, and similar blocks 38 are interposed between the knives 22, 24, and 26, these blocks being held in place by screws 39 and 40 inserted respectively through the retaining strips 36 and 41 of the upper die structure. The said strips 36 and 41 are clamped in place upon the blocks 42 of the die head by screws or bolts 43 extending transversely through the same on each side of the die. The two sections of the die are, therefore, exact counterparts of each other, and are arranged parallel and longitudinally of the direction of travel of the sheet material, being suitably secured in position on the head 9, as shown more clearly in Fig. 3, whereby the blank is formed by a single downward stroke of the said head. It will be, of course, understood that the eccentrics 12 and the feed device C are so timed relative to each other that the blank is formed while the sheet material is standing still, the feed device operating intermittently and serving to feed the sheet material forward while the upper die of the blanking press is in an elevated position.

The box or basket-forming mechanism D, shown more clearly in Figs. 7, 8 and 9, comprises a hollow and inverted form or mold $d$ provided with flaring sidewalls 44 and 45, the latter being provided with slots or openings 46 to receive the staples, and the said sidewalls being connected together by a tapered corner section 47, whereby the flat corner portions 48 of the box are properly shaped during the forming operation. The said mold $d$ is secured to the lower end of a tubular stem 49, the latter being mounted for vertical reciprocation in a stationary bearing 50 suitably mounted on the machine frame. The upper end of this stem is provided with a collar 51 which is yieldingly held down by the rubber 52 suitably interposed between said bearing 50 and the base of said stem 49. The mold $d$, with this arrangement, is capable of slight upward movement, the downward movement is then cushioned by the rubber washer 53 upon which the collar 51 descends. The folding device 54 is shaped like the bottom of the box or basket, and is provided with holes 55 to receive the feet 18 of the box during the operation of folding the sheet material. A rod or stem 56 slides up and down in the tube 49 and is provided at its upper end with a head 57 which is yieldingly held down by springs 58 suitably connected with their lower ends to stationary portions of the machine. The device 54 is fixed on the lower end of said rod or stem 56 and moves up and down therewith. A rubber cushion 59 rests on top of the collar 51 to provide a bumper for the head 57 when the rod 56 moves downward after the folding operation is completed, it being observed that this also serves to eject the finished box or basket downward from the mold. A spline 60 is employed in a suitable manner for preventing rotation of the rod 56, and the tube 49 is held against rotation by any suitable means. A vertically reciprocating plunger E is disposed immediately below the mold $d$, this plunger being upwardly tapered to exactly fit the interior of the box or basket. Said plunger is provided at each side thereof with a clench block $e$ for clenching the staples 61 which are inserted to hold the flaps 62 and 63 in folded and overlapped condition at the opposite sides of the box. When the plunger E moves upward, the blank shown in Fig. 5 is carried upward against the lower edges of the mold $d$ and the folding device 54, with the result that the device 54 and the top of the plunger coöperate for producing the initial folding operation. The continued upward movement of the plunger finally brings the sides of the box into engagement with the side walls of the mold $d$, but this movement of the box is arrested before the feet 18 reach the top of the mold, thereby insuring clearance between the top of the device 54 and the upper wall of the mold, and thus preventing breakage of said feet. The mold $d$ can move upward slightly with the final thrust of the plunger, and this will bring the box into position to be stapled. Also, and should one or more boxes remain on the plunger, this upward movement of the mold will prevent breakage which might result from the superimposed thicknesses of sheet of material. The formation of the device 54 and the mold form $d$ is such that the walls 34 of the blank are folded inward and receive the flaps 62 and 63 upon the outer surfaces thereof. If thin wood veneer is employed as a sheet material from which to make the blanks, then the lower corners 64 of the box are not formed by score lines, inasmuch as the grain of the wood must run parallel with these corners in order to properly form the feet 18—that is to say, in order that the grain of the wood may extend up and down in said feet and thereby render the latter strong and non-breakable in character. But if paper or other fiber board is employed as the sheet material, then additional scoring knives or blades can be employed for scoring the material along lines to form corners 64, and it will be understood that these knives or blades can be secured to the upper die in any suitable manner.

The staplers F may be of any suitable known or approved character and operate through the openings or notches 46 of the mold to insert the staples 61 at opposite sides of the box. As shown, these staplers are arranged obliquely and at angles suitable for the insertion of said staples while the box is still on the plunger. Bell cranks $f$ are connected by rods 65 with a lever 66 which is pivoted on the base of the machine at 67 and operated by an eccentric on the shaft 7, or by any other suitable means. The wire for the staples is fed to the staplers by the feed devices G, supported in any suitable manner at the end of the machine, it being observed that the wire is fed in two parallel strands in the direction from which the sheet material is fed to the forming mechanism. Feed pawls $g$ operate the said wire feeding rolls G, these pawls being suitably operated by an eccentric on the shaft 7, or in any suitable manner. The plunger E is provided with a downwardly extending shank 68 which slides up and down in the stationary guide 69, the lower end of said shank being connected by a link 70 with an eccentric device of the shaft 7, whereby the plunger is reciprocated up and down. It will be understood that the plunger and staplers and wire feeding devices are properly timed in their operations, by properly positioning their various eccentrics in such manner that they operate in a way to produce the results described.

Thus it will be seen that the feed device C intermittently feeds the sheet material to the blanking press, and from the latter to the forming mechanism, the blanks being formed while the sheet is stationary, and a box being formed while the blank for the next box is being made. The blanking press properly punches the sheet material to form the ventilating openings 71 in the bottom of the box, and to form the feet 18, and the forming mechanism comprising the plunger and mold and device 54 then coöperate to fold the blank in such manner that the feet extend downwardly from the bottom of the finished box. As previously stated, the forming mechanism is of a character to properly fold the blank and then receive the staples without causing breakage of the feet 18 of the box. This can be accomplished by provisions of any suitable character, such for example, as the clearance shown and described in the top of the mold for receiving the feet 18; but other means or expedients may be employed for this purpose, depending upon the character of the material and the circumstances of any particular case, and I do not limit myself to the exact construction shown and described. For example, the thickness of the top wall of the device 54 may be sufficient to prevent the ends of said feet 18 from engaging the top wall of the mold $d$, thereby preventing breakage of said feet during the folding and forming operation.

I do not limit myself to the exact construction shown and described.

What I claim as my invention:—

1. A machine for making receptacles from sheet material, of the kind in which the bottom of the receptacle is provided with openings formed by cutting out portions thereof to extend downward in rigid continuation of certain side walls, thereby forming feet to support the receptacle in slightly elevated position, comprising forming mechanism constructed to fold the sheet material and having provisions to allow displacement of said feet from said openings in the bottom during the folding operation and permit forming of the receptacle without injuring said feet, and staplers for securing the folded sheet material together at opposite sides of said receptacle.

2. A machine for making receptacles from sheet material, of the kind in which the bottom of the receptacle is provided with openings formed by cutting out portions thereof to extend downward in rigid continuation of certain side walls, thereby forming feet to support the receptacle in slightly elevated position, comprising forming mechanism constructed to fold the sheet material and form the receptacle without injuring said feet, and staplers for securing the folded sheet material together at opposite sides of said receptacle, instrumentalities to form said feet in the sheet material ahead of said forming operation, and devices to feed the material to said mechanism.

3. A machine for making receptacles from sheet material, of the kind in which the bottom of the receptacle is provided with openings formed by cutting out portions thereof to extend downward in rigid continuation of certain side walls, thereby forming feet to support the receptacle in slightly elevated position, comprising forming mechanism constructed to fold the sheet material and having provisions to allow displacement of said feet from said openings in the bottom during the folding operation and permit forming of the receptacle without injuring said feet, and staplers for securing the folded sheet material together at opposite sides of said receptacle, said forming-mechanism including provisions at the top thereof to accommodate said feet.

4. A machine for making receptacles from sheet material, of the kind in which the bottom of the receptacle is provided with openings formed by cutting out portions thereof to extend downward in rigid continuation of certain side walls, thereby forming feet to support the receptacle in slightly elevated position, comprising forming mechanism constructed to fold the sheet material and form the receptacle without injuring said feet, and staplers for securing the folded sheet material together at opposite sides of said receptacle, instrumentalities to form said feet in the sheet material ahead of said forming operation, and devices to feed the material to said mechanism, said forming-mechanism including provisions at the top thereof to accommodate said feet.

5. A machine for making receptacles from sheet material, of the kind in which the bottom of the receptacle is provided with openings formed by cutting out portions thereof to extend downward in rigid continuation of certain side walls, thereby forming feet to support the receptacle in slightly elevated position, comprising forming mechanism constructed to fold the sheet material and having provisions to allow displacement of said feet from said openings in the bottom during the folding operation and permit forming of the receptacle without injuring said feet, and staplers for securing the folded sheet material together at opposite sides of said receptacle, said mechanism including a plunger arranged for upward movement to form the receptacle, and having provisions above said plunger to receive said feet, said staplers being arranged to operate on said certain walls of the receptacle.

6. A machine for making receptacles from sheet material, of the kind in which the bottom of the receptacle is provided with openings formed by cutting out portions thereof to extend downward in rigid continuation of certain side walls, thereby forming feet to support the receptacle in slightly elevated position, comprising forming mechanism constructed to fold the sheet material and form the receptacle without injuring said feet, and staplers for securing the folded sheet material together at opposite sides of said receptacle, instrumentalities to form said feet in the sheet material ahead of said forming operation, and devices to feed the material to said mechanism, said forming-mechanism including a plunger arranged for upward movement to form the receptacle, and having provisions above said plunger to receive said feet, said staplers being arranged to operate on said certain walls of the receptacle.

7. A machine for making receptacles from sheet material, of the kind in which the bottom of the receptacle is provided with openings formed by cutting out portions thereof to extend downward in rigid continuation of certain side walls, thereby forming feet to support the receptacle in slightly elevated position, comprising forming mechanism constructed to fold the sheet material and having provisions to allow displacement of said feet from said openings in the bottom during the folding operation and permit forming of the receptacle without injuring said feet, and staplers for securing the folded sheet material together at opposite sides of said receptacle, said forming-mechanism including a plunger and means coöperating therewith to accomplish the entire folding operation by the thrust of said plunger against a flat unfolded blank of sheet material.

8. A machine for making receptacles from sheet material, of the kind in which the bottom of the receptacle is provided with openings formed by cutting out portions thereof to extend downward in rigid continuation of certain side walls, thereby forming feet to support the receptacle in slightly elevated position, comprising forming mechanism constructed to fold the sheet material and form the receptacle without injuring said feet, and staplers for securing the folded sheet material together at opposite sides of said receptacle, instrumentalities to form said feet in the sheet material ahead of said forming operation, and devices to feed the material to said mechanism, said mechanism including a plunger and means coöperating therewith to accomplish the entire folding operation by the thrust of said plunger against a flat unfolded blank of sheet material.

9. A machine for making receptacles from sheet material, of the kind in which the bottom of the receptacle is provided with openings formed by cutting out portions thereof to extend downward in rigid continuation of certain side walls, thereby forming feet to support the receptacle in slightly elevated position, comprising forming mechanism constructed to fold the sheet material and having provisions to allow displacement of said feet from said openings in the bottom during the folding operation and permit forming of the receptacle without injuring said feet, and staplers for securing the folded sheet material together at opposite sides of said receptacle, said machine comprising a blanking press for making a blank and cutting said feet therein, and means for feeding the blank from said press to said mechanism, operative to properly position said feet in said mechanism, said press having means for severing the blank from the sheet along a line at right angles to said feet, this line being parallel with the plane of said staplers.

10. A machine for making receptacles from sheet material, of the kind in which the bottom of the receptacle is provided with openings formed by cutting out portions thereof to extend downward in rigid continuation of certain side walls, thereby forming feet to support the receptacle in slightly elevated position, comprising forming mechanism constructed to fold the sheet material and having provisions to allow displacement of said feet from said openings in the bottom during the folding operation and permit forming of the receptacle without injuring said feet, and staplers for securing the folded sheet material together at opposite sides of said receptacle, said forming-mechanism comprising upper and lower forming elements, a plunger for moving one element toward and into the other, and means to preserve a clearance within said elements, which clearance is for said feet.

11. A machine for making receptacles from sheet material, of the kind in which the bottom of the receptacle is provided with openings formed by cutting out portions thereof to extend downward in rigid continuations of certain side walls, thereby forming feet to support the receptacle in slightly elevated position, comprising forming mechanism constructed to fold the sheet material and form the receptacle without injuring said feet, and staplers for securing the folded sheet material together at opposite sides of said receptacle, instrumentalities to form said feet in the sheet material ahead of said forming operation, and devices to feed the material to said mechanism, said forming-mechanism comprising upper and lower forming elements, a plunger for moving one element toward and into the other, and means to preserve a clearance within said elements, which clearance is for said feet.

Signed by me at Chicago, Illinois, this 17th day of March, 1915.

EDWARD CRAIG.

Witnesses:
RACHEL J. RICHARDSON,
ROSE E. SCHWEM.